United States Patent
Avidor et al.

(10) Patent No.: US 6,654,612 B1
(45) Date of Patent: Nov. 25, 2003

(54) DISTRIBUTED CHANNEL ASSIGNMENT METHOD

(75) Inventors: Dan Avidor, Little Silver, NJ (US); Sayandev Mukherjee, Lanoka Harbor, NJ (US); Jeong-Dong Ryoo, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 415 days.

(21) Appl. No.: 09/607,499

(22) Filed: Jun. 30, 2000

(51) Int. Cl.[7] ............................................. H04Q 7/20
(52) U.S. Cl. ..................... 455/450; 455/452; 455/447; 455/435
(58) Field of Search ............................. 455/452, 453, 455/450, 451, 435, 436, 437, 438, 447, 446, 422; 370/329, 341, 431, 455

(56) References Cited

U.S. PATENT DOCUMENTS

| | | | |
|---|---|---|---|
| 5,530,917 A | * 6/1996 | Andersson et al. | ......... 455/436 |
| 5,802,456 A | 9/1998 | Hulsebosch | .................. 455/63 |
| 5,828,963 A | * 10/1998 | Grandhi et al. | ............. 455/450 |
| 5,963,848 A | * 10/1999 | D'Avello | ..................... 455/62 |
| 6,023,623 A | * 2/2000 | Benkner et al. | ......... 455/452.2 |
| 6,108,321 A | * 8/2000 | Anderson et al. | ........... 370/329 |
| 6,154,655 A | * 11/2000 | Borst et al. | .................. 455/451 |
| 6,308,066 B1 | * 10/2001 | Ranta et al. | ................. 455/436 |
| 6,553,229 B1 | * 4/2003 | Dent | .......................... 455/434 |
| 2001/0055297 A1 | * 12/2001 | Benveniste | ................. 370/349 |
| 2003/0054829 A1 | * 3/2003 | Moisio | ....................... 455/452 |

FOREIGN PATENT DOCUMENTS

| | | | |
|---|---|---|---|
| DE | 196 25 856 A | 6/1996 | ............ H04Q/7/36 |
| DE | 196 25 856 A1 | 6/1996 | ............ H04Q/7/36 |
| EP | 0 684 744 A | 4/1995 | ............ H04Q/7/36 |
| EP | 0 817 521 A | 6/1997 | ............ H04Q/7/38 |
| WO | WO 97/15995 | 5/1997 | ............ H04Q/7/36 |
| WO | WO 99/14967 | 3/1999 | ............ H04Q/7/36 |

* cited by examiner

*Primary Examiner*—Nay Maung
*Assistant Examiner*—Edan Orgad
(74) *Attorney, Agent, or Firm*—Eugene J. Rosenthal

(57) ABSTRACT

Without intercell coordination on a per communication request basis, channel assignment can be efficiently performed by developing for each cell, or a sector thereof when the cells are sectorized using directional antennas, a priority list of groups of channels, and selecting a channel to be assigned in response to a request for service from the highest priority group which has available channels at the time of the service request. The priority lists are developed based on various interference measurements that are made. The priority lists tend to remain the same for relatively long periods of time. However, periodically, the priority lists should be redetermined to insure that the best lists are being employed. For example the lists may need to be changed due to new construction or to seasonal vegetation changes which may affect the interference experienced in the system. Advantageously, system capacity under peak concentrated load conditions may increase. This advantage is further magnified under field conditions for which the cell shapes are not ideal.

45 Claims, 8 Drawing Sheets

DISTRIBUTED CHANNEL ASSIGNMENT METHOD

TECHNICAL FIELD

This invention relates to wireless communication systems in which areas served by the wireless communication system are divided at least into cells, and more particularly, to a system for dynamically allocating available system channels to wireless terminals requiring service.

BACKGROUND OF THE INVENTION

A problem in the art of wireless communication is to minimize interference between the links, each of which uses at least one channel, employed in neighboring cells while maximizing the overall use of the available spectrum. One prior art method to increase the spectrum utilization is to reuse the same channels at appropriate geographic separations. How to arrange the assignments of the channels to cells so that they may be reused to maximize the overall use of the available spectrum while minimizing the interference between the channels is the so-called "channel reuse problem".

It has been recognized in the art that dynamic channel assignment systems perform better than static channel assignment systems. One reason for this is because the number of users in any particular cell changes over rime, and such dynamic systems can respond to such changes. Another reason is the ability to share channels on a need to have them basis. However, the best performing prior art dynamic channel assignment systems require some form of intercell communication for each communication request, to coordinate the channel assignments. Disadvantageously, such intercell communication adds latency to the channel assignment process which degrades system performance. Such degradation can be especially acute for high-speed data communication which is bursty and often transfers only small amounts of data at any time, e.g., mouse clicks or packet acknowledgments. Further disadvantageously, the requirement of communication between the base stations places an additional load on the base stations and on the inter-base-stations network, which consumes additional resources and can degrade performance.

SUMMARY OF THE INVENTION

We have recognized that, even without intercell coordination on a per communication request basis, channel assignment can be efficiently performed by, developing for each cell, or a sector thereof when the cells are sectorized using directional antennas, a priority list of groups of channels, and selecting a channel to be assigned in response to a request for service from the highest priority group which has available channel at the time of the service request. The priority lists are developed based on various interference measurements that are made. The priority lists tend to remain the same for relatively long periods of time. However, periodically, the priority lists should be redetermined to insure that the best lists are being employed. For example the lists may need to be changed due to new construction or to seasonal vegetation changes, which may affect the interference experienced in the system. Advantageously, system capacity under peak concentrated load conditions may increase. This advantage is further magnified under field conditions for which the cell shapes are not ideal.

DETAILED DESCRIPTION

Figure 1:
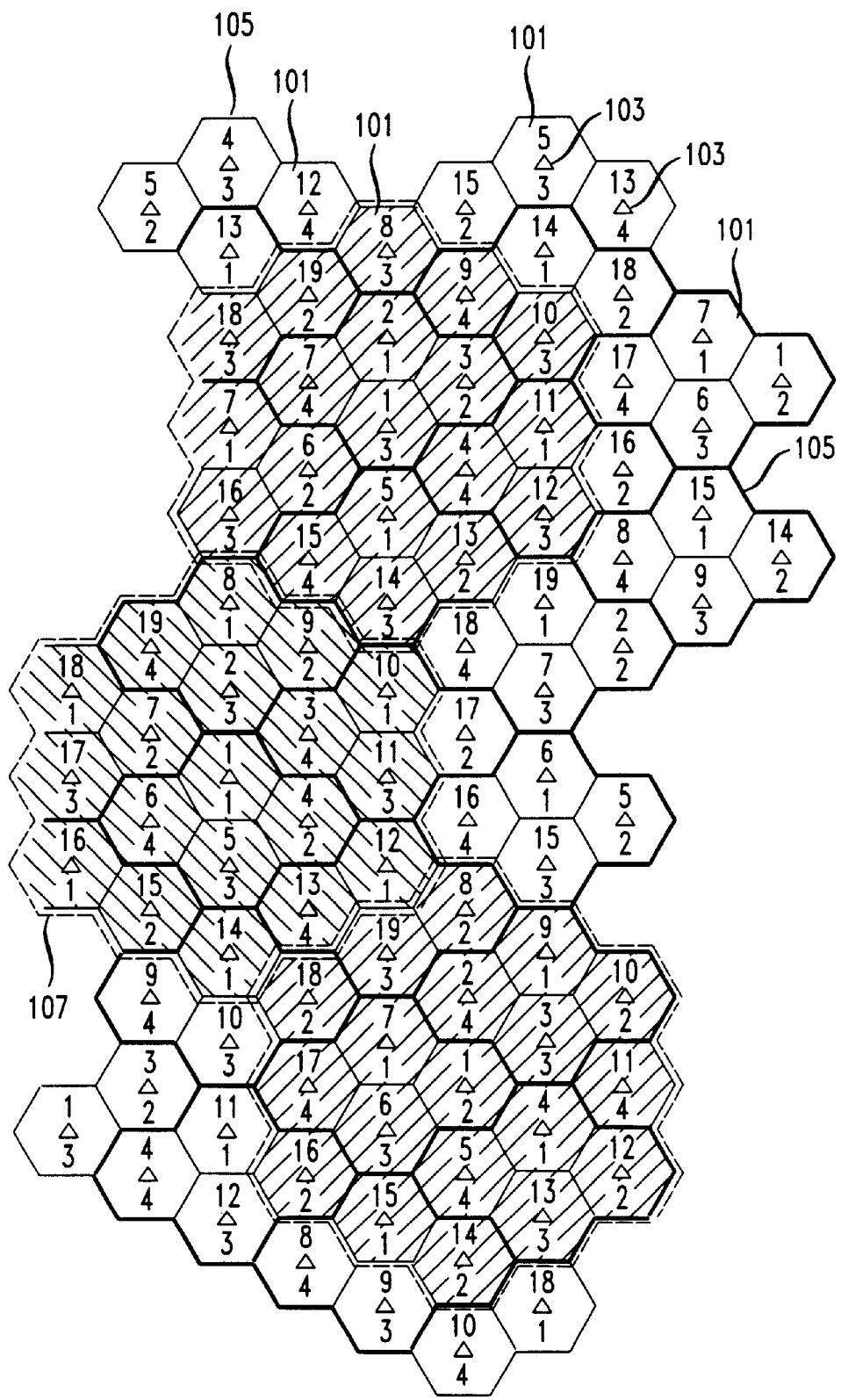
FIG. 1 shows a locality which is served by a fixed wireless system.
Figure 2A:
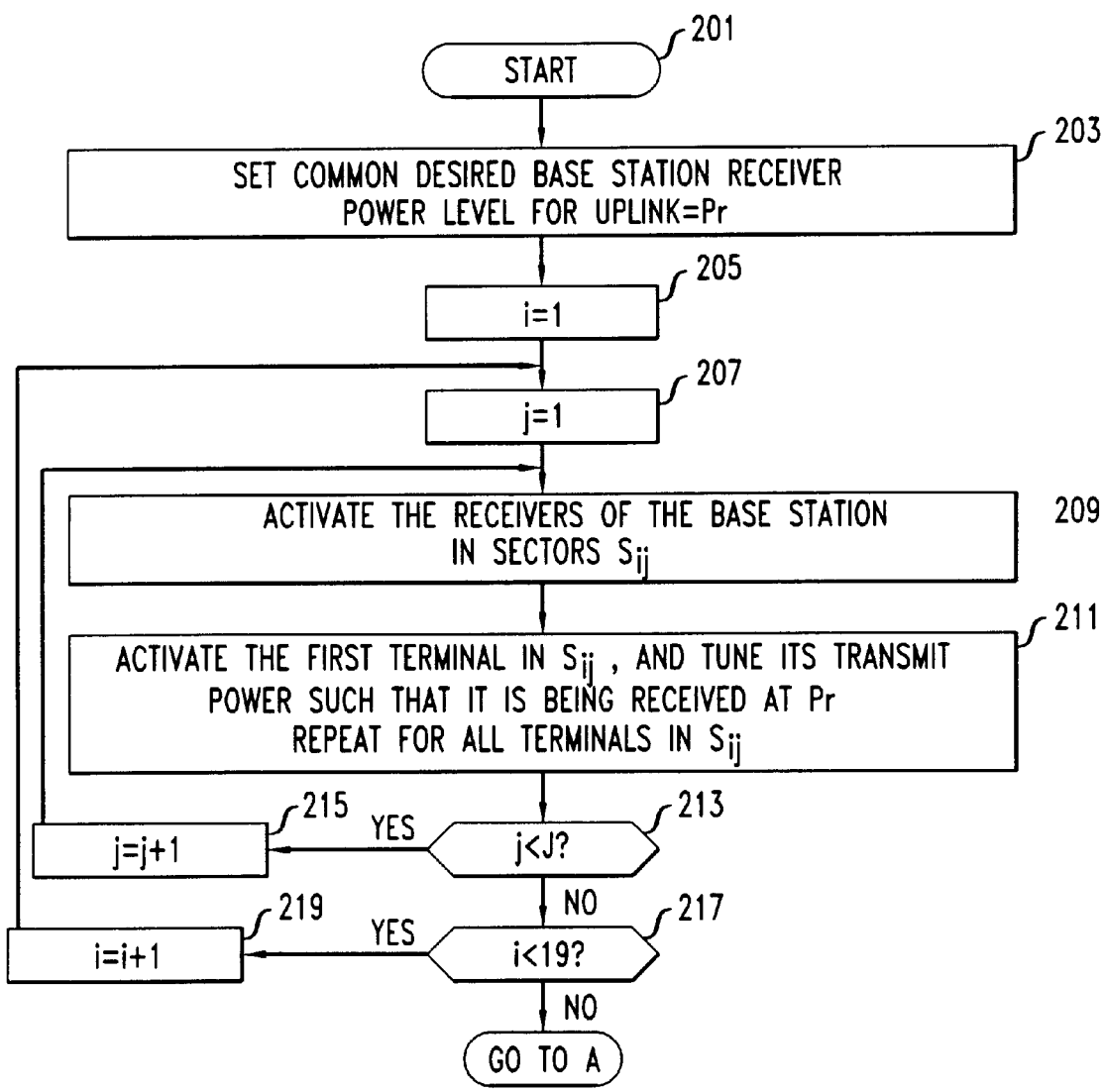
FIG. 2 shows a flowchart for an exemplary process for performing interference measurements that are necessary to develop priority lists in accordance with an aspect of the invention.
Figure 2B:
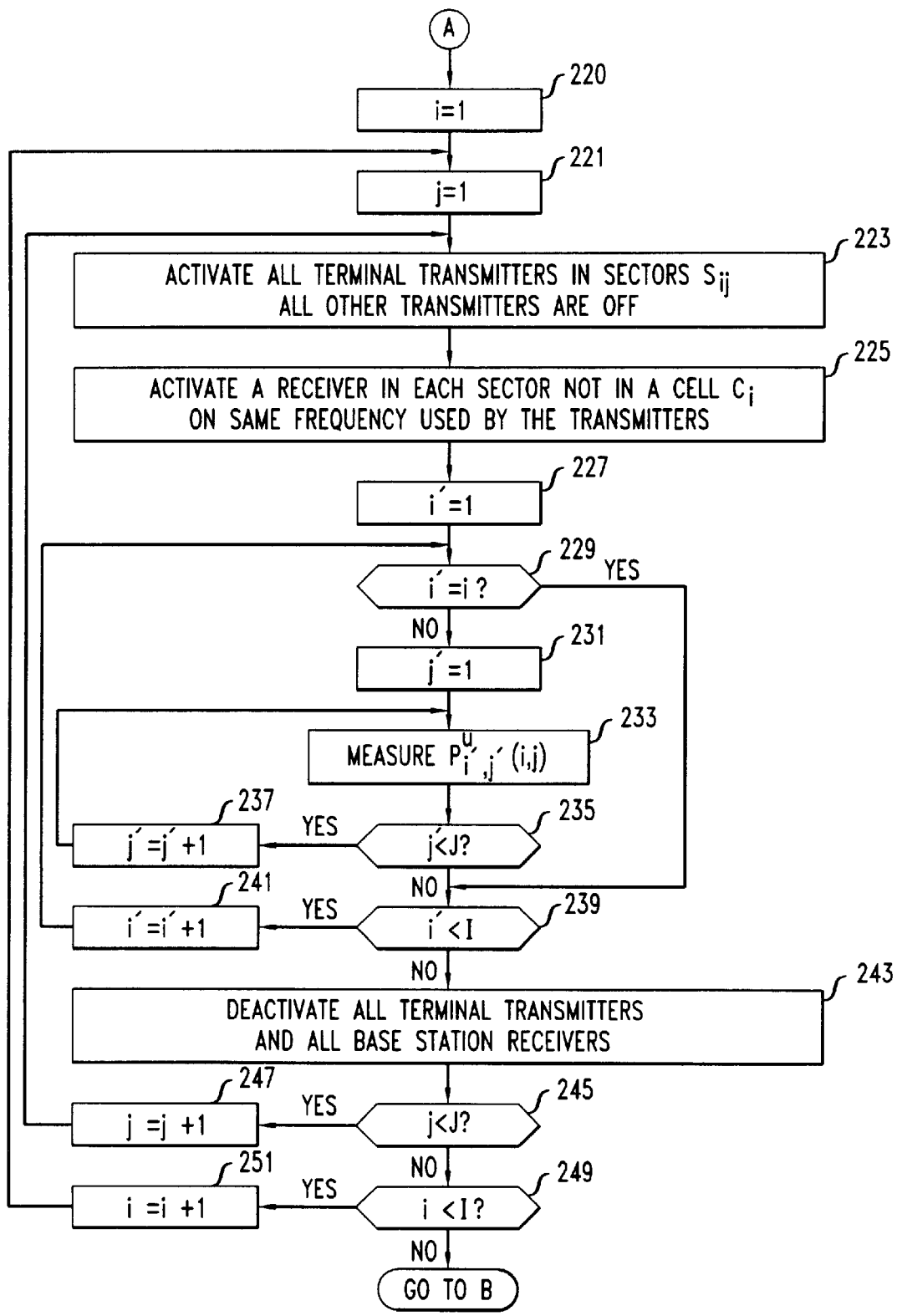
Figure 2C:
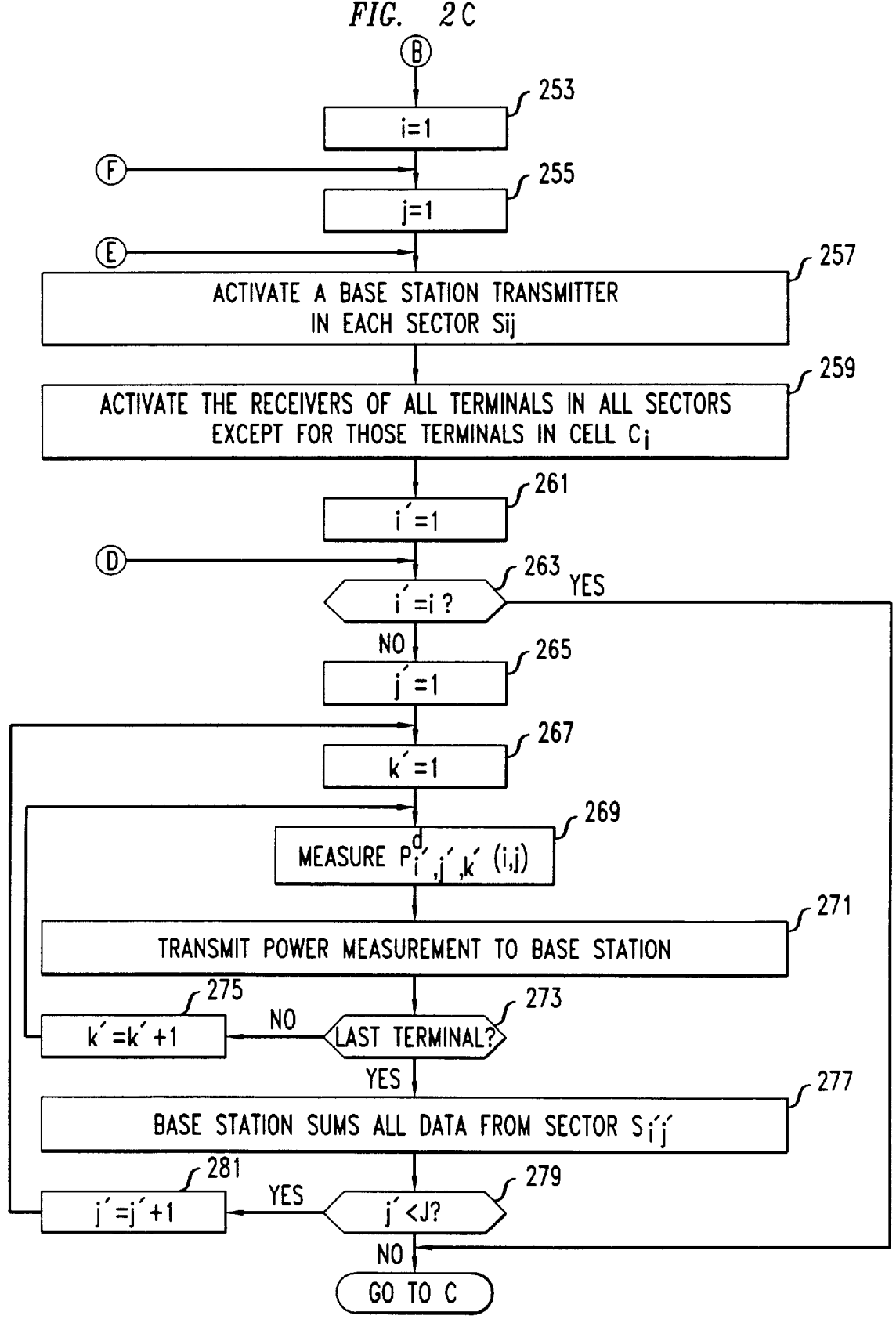
Figure 2D:
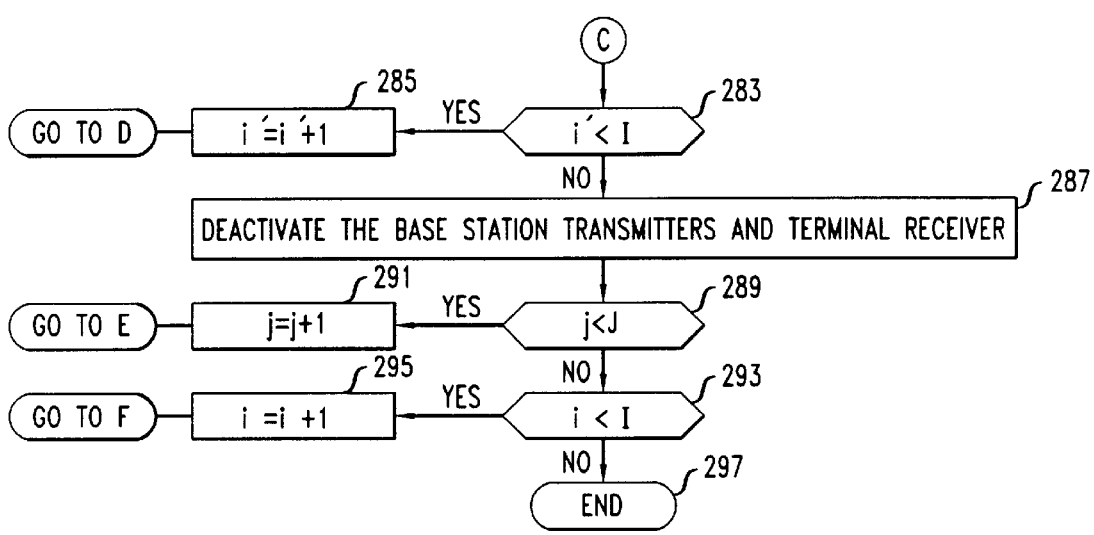

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows a locality which is served by a fixed wireless system. As is well known, a fixed wireless system is a wireless system in which not only are the base stations at a fixed location, but so are the terminals (not shown). The locality is divided into cells 101, each cell including one of base stations 103. Conceptually, the locality may be viewed as if extended indefinitely in any direction.

For purposes of channel reuse, the cells of FIG. 1 are arranged into a first set of fixed clusters 105 of non-overlapping set of F cells, as in the prior art, the so-called "reuse clusters", according to a channel reuse plan. For example, F=4 is widely used for implementation of Global System Mobile (GSM). Such an example is shown in FIG. 1, in which the channel reuse clusters are delineated in FIG. 1 by the bold border lines. Note that, as shown in FIG. 1, there may be cells that not part of a complete reuse cluster. Nevertheless, each such cell is assigned a number as if the cells that were missing from its reuse cluster did indeed exist, in accordance with the concept of an infinite locality Each cell of a reuse cluster is assigned a set of uplink channels, which makes up the cell's primary uplink channel group, and a set of downlink channels, which makes up the cell's primary downlink channel group. Like positioned cells within each cluster are assigned the same uplink and downlink channel groups. Furthermore, if the cells are sectorized, sets of the channels of each cells primary uplink and downlink channel groups may be allocated to each sector within the cell as primary uplink and downlink channels groups for the sector, with like positioned sectors with each reuse cluster being assigned the same primary uplink and downlink channel groups. In FIG. 1, each cell of a reuse cluster is assigned one of four primary groups of channels, the particular group being indexed by the lower number in each cell.

Additionally, irrespective of the first clustering into reuse clusters, for purposes of the invention, the cells are also arranged into a second set of nonoverlapping fixed interference clusters 107 of I cells. An exemplary value of I is 19. Each cell in a fixed interference cluster is assigned a number from 1to I. These numbers are shown in FIG. 1 as the upper index in each cell of FIG. 1. Like positioned cells within each cluster are assigned the same number, so that the distance between like numbered cells is maximized. Complete fixed interference clusters are shown with shading in FIG. 1. Note that, as shown in FIG. 1, there may be cells that not part of a complete fixed interference cluster. Nevertheless, each such cell is assigned a number as if the cells that were missing from its fixed interference cluster did indeed exist, in accordance with the concept of an infinite locality.

Thus, each cell is part of two fixed clusters, its reuse cluster and its fixed interference cluster, with respective indices which indicate the cell's position within each of the clusters.

The exemplary fixed interference cluster size of I=19 cells was chosen based on the assumption that interference to a receiver caused by a transmitter not located in the same cell and not in the first two rings of cells surrounding the receiver's cell is low enough to be ignored. In other words, it is assumed that interference can only originate from the two rings surrounding a cell in which the receiver is located. However, those of ordinary skill in the art will readily appreciate how to apply the principles of the invention in the event that a different second cluster size should be chosen because the interference is either greater or less than postulated by this assumption.

In addition to fixed reuse clusters 105 and fixed interference clusters 107, each cell is also at the center of its own relative interference cluster of I cells, which includes the cell and the group of I-1 cells located in the two closest rings surrounding the cell. For clarity purposes, because of the extreme overlapping nature of the relative interference clusters, the relative clusters are not shown in FIG. 1. It should be appreciated, however, that in the example shown in FIG. 1 each cell with a fixed interference cluster index of 1 has as its relative interference cluster the fixed interference cluster of which it is a part. There may be cells that are not part of a complete relative interference cluster, e.g., at the physical borders of the locality. Nevertheless, each such cell is part of a relative cluster as if the cells that were missing from its relative interference cluster did indeed exist, in accordance with the concept of an infinite locality.

In accordance with an aspect of the invention, it is possible to use a relatively high channel reuse factor. Doing so is advantageous, because it reduces interference in a lightly loaded system. However, because of the ability of one cell to "borrow" channels assigned to another cell, in accordance with the principles of the invention, the penalty of reduced capacity associated with a high reuse factor in prior art systems is mitigated. Note that although FIG. 1 shows a channel reuse factor of 4, this should not be construed as limiting, in that the value of FIG. 1 was chose for clarity of exposition purposes only, given the limited space available in FIG. 1 as well as the familiarity of those of ordinary skill in the art with the GSM reuse factor of 4. Thus, FIG. 5, described hereinbelow, shows another example with a reuse factor of 7, and reuse factors of 19 or more may be employed.

The uplink and downlink channels assigned for use in communicating with a, terminal in response to a service request are selected by a so-called "local" controller associated with that cell. More specifically, in accordance with the principles of the invention, the local controller assigns the channels for the terminal by selecting a channel from a highest priority group of prioritized groups of channels for the cell, or sector thereof, in which the terminal is located, which has an available channel at the time of the service request, without requiring intercell communication on a per-request basis. For bi-directional communication, an uplink and a downlink channel need to be assigned.

By "local" it is meant that the controller serves one cell or a group of neighboring cells. Thus, although the following description is for an embodiment of the invention in which each cell has its own local controller, those of ordinary skill in the art will readily be able to implement embodiments of the invention in which a single local controller serves more than one cell. Typically the controller is software that executes on the hardware of the computer of a base station for which the controller assigns the channels. In the embodiment of the invention described hereinbelow, each cell has its own local controller, which is referred to as a cell controller.

FIG. 2 shows a flowchart of a process for performing exemplary interference measurements of the type that can be used to develop priority lists in accordance with an aspect of the invention. Such measurements are employed to determine intercellular, or intersector should sectorization be employed, interference, and should be repeated from time to time in order to: have accurate measurements in the face of changes in the environment which affect intercellular interference, such as a) man made changes, e.g., the putting up or talking down of a building, or b) seasonal changes, such as the presence or absence of leaves.

Prior to the start of the process in FIG. 2 the locality is divided, as noted above, into fixed nonoverlapping fixed interference clusters of I cells, e.g., clusters 107 shown in FIG. 1, so that, for example, when I=19 there are 19 cells per fixed interference cluster. Similarly, each cell is divided into J sectors, J being an integer greater than or equal to 1, so that, for example, when J=3 there are 3 sectors per cell. Each sector in a cell is assigned a number from 1 to J, with like positioned sectors within each cell being assigned the same number. Thus, the cells within each cluster may be denoted Ci, where i=1 to I and each sector within a cluster may be denoted as Sij, i=1 to I,j=1 to J. Note that, for the conceptually infinite locality, Sij is an infinite group of sectors.

The process is entered in step 201, when it is determined that it is time to initiate a the measurements that are required to set the priority lists. In step 203 a common base station received power level for the uplink is set to Pr, e.g. −90 dBm. In other words, the transmit power for the transmitter of each of the terminals will be set so that each terminal is being received at the base station with a received power of Pr. To this end, in step 205 the value of i is initialized to 1 and in step 207 the value of j is likewise initialized to 1. Thereafter, in step 209, the receivers of the base stations in sector Sij of each of the clusters are activated.

In step 211, each terminal in each sector Sij of each cluster is activated one at a time and its transmit power is tuned so that the transmitted signal is received at its corresponding base station sector receivers with a power of Pr. Control then passes to conditional branch point 213, which tests to determine if j<J, i.e., if there remains any sector in the cell that have not had the transmit power of each of its terminals set so as to be received at the base station with a power of Pr. If the test result in step 213 is YES, which indicates that there remains at least one sector in the cell that has not had the transmit power of each of its terminals set so as to be received at the base station with a power of Pr, control passes to step 215, in which j is incremented, so that it points to the next sector of the cell. Control then passes back to step 209 and the process continues as described above. If the test result in step 213 is NO, indicating that all the terminals in all the sectors have had the transmit powers of each of their terminals set so as to be received at the base station with a power of Pr, control passes to conditional branch point 217.

Conditional branch point 217 tests to determine if i<I., i.e., if there remains any cell in the cluster that has not had the transmit power of each of its terminals set so as to be received at the base station with a power of Pr. If the test result in step 217 is YES, indicating that there indeed remains at least one cell in the cluster that has not had the transmit power of each of its terminals set, control passes to step 219, in which i is incremented, so that it points to the next cell of the cluster. Control then passes back to step 207 and the process continues as described above. If the test result in step 217 is NO, indicating that all the terminals in all the cells of all the clusters have had their transmit powers set, control passes to step 220.

Now that the transmit power of all the terminals have been set, the following steps describe a process of measurement designed to find out the relative interference potential between sectors.

In step 220 the value of i, which is used as the index of the transmitting cell within a cluster, is initialized to 1. Then in step 221 the value off, which is used as the index of the transmitting sector within a cells, is likewise initialized to 1. Next, all terminals in sector Sij of each cluster have their transmitters activated, in step 223. Furthermore, all other transmitters in the cluster are kept off. Thereafter, a base station receiver is activated in each sector of every cell of every cluster, except those receivers that are in the cells Ci, in step 225. The receiver that is activated is tuned to the same frequency on which the terminal transmitters are transmitting.

In step 227 a receiving cell index i' is initialized to 1. Conditional branch point 229 tests to determine if i'=i. If the test result in step 229 is NO, indicating that the cell being pointed to by i' is not the cell for which the base station receivers are off, control passes to step 231, which initializes a receive sector counter j' to 1. An uplink power measurement $P_{i',j'}{}^u(i,j)$ is then measured and recorded in step 233. This notation indicates that the power measured P is an uplink power measurement, as denoted by the superscript u, with the indices inside the parenthesis representing the transmitting sector and the subscripted i',j' indicating the measuring sector.

Conditional branch point 235 tests to determine if j'<J, i.e., if there remains any sectors in the measuring cell that have not yet had the uplink power from the transmitting sectors measured yet. If the test result in step 235 is YES, which indicates that there remains at least one sector in the measuring cell that has not yet had the uplink power from the transmitting sectors, control passes to step 237, in which j' is incremented, so that it points to the next sector of the cell. Control then passes back to step 233, and the process continues as described above. If the test result in step 235 is NO, indicating that all the sectors in the measuring cell have measured the uplink power from the transmitting sectors, or the test result in step 229 is YES, which indicates that the cell being pointed to by i' is the cell for which the base station receivers are off, control passes to conditional branch point 239.

Conditional branch point 239 tests to determine if i'<I, i.e., if there remains any cell in the cluster, other than the cell for which the base station receivers are off, that has not yet had the uplink power from the transmitting sectors measured. If the test result in step 239 is YES, indicating that there is at least one cell in the cluster that has not yet measured the uplink power from the transmitting sectors, control passes to step 241, in which i' is incremented, so that it points to the next cell of the cluster. Control then passes back to step 229 and the process continues as described above. If the test result in step 239 is NO, indicating that each cell in the cluster has measured the uplink power from the transmitting sectors, control passes to step 243.

Note that for pedagogical purposes, steps 227 through 239 are shown as being sequentially performed. However, those of ordinary skill in the art will readily recognize the advantage in time saved that can be realized by compressing the effects of these steps to perform each of the measurements required by the iterations of step 233 in parallel.

In step 243 all the terminal transmitters and all the base station receivers which had been transmitting are deactivated. Next, conditional branch point 245 tests to determine if j<J, i.e., if there remains any sectors in the cell that has not had all of its terminals activated and transmit. If the test result in step 245 is YES, indicating that there indeed remains at least one sector in the cell that has not had all of its terminals activated and transmit, control passes to step 247, in which j is incremented, so that it points to the next sector of the cell. Control then passes back to step 223 and the process continues as described above. If the test result in step 245 is NO, indicating that all of the sectors in the cell have had its terminals activated and transmit, control passes to step 249.

Conditional branch point 249 tests to determine if i<I., i.e., if there remains any cell in the clusters that has not had all of its terminals activated and transmit. If the test result in step 249 is YES, indicating that there indeed remains at least one cell in the cluster that has not had all of its terminals activated and transmit, control passes to step 251, in which i is incremented, so that it points to the next cell of the cluster. Control then passes back to step 221 and the process continues as described above.

If the test result in step 249 is NO, indicating that all the terminals in all the cells of all the clusters have had their terminals activated and transmit, control passes to step 253, in which the value of i is initialized to 1. In step 255 the value of j is likewise initialized to 1. In step 257, a transmitter of each base station in sector Sij of each of the clusters is activated. The receivers of all terminals in all sectors of all the cells, except those receivers located in the sectors of cell Ci are activated, in step 259.

In step 261 a receiving cell index i' is initialized to 1. Conditional branch point 263 tests to determine if i'=i. If the test result in step 263 is NO, indicating that the cell being pointed to by i' is not the cell for which the base station transmitters are on, control passes to step 265, which initializes a receive sector counter j' to 1. A terminal counter k' is initialized to 1 in step 267, where k' ranges from 1 to the number of terminals in the particular sector.

Each terminal k' measures, in step 269, the power that it receives, which is denoted $P_{i',j',k'}^{d}(i,j)$, where the superscript d denotes a downlink power, the indices i,j inside the parenthesis indicate the transmitting sector, the subscripts i',j' indicate the measuring sector, and k' indicates the particular terminal within the measuring sector. The terminal transmits the power measurement taken in step 269 to its associated base station in step 271.

Conditional branch point 273 tests to determine if k' is the last terminal in the sector, i.e., if there are no further terminals remaining in the sector that need to measure their downlink power and transmit it to the base station. If the test result in step 273 is NO, indicating there yet remains additional terminals to measure their receive power and transmit it to the base station, control passes to step 275, in which the value of k' is incremented. Control then passes back to step 269 and the process continues as described above. If the test result in step 273 is YES, indicating that there are no further terminals to measure their receive power and transmit the measurement to the base station, control passes to step 277, in which the in which the base station sums the data it received from sector Si'j', i.e., the base station computes $$\overset{d}{P}_{i',j'}(i,j) = \sum_{k'} P_{i',j',k'}^{d}(i,j).$$

Conditional branch point 279 then tests to determine if j'<J, i.e., if there remains any sectors in the measuring cell that have not yet had their downlink interference power determined. If the test result in step 279 is YES, which indicates that there remains at least one sector in the measuring cell that has not yet had its downlink interference power determined, control passes to step 281, in which j' is incremented, so that it points to the next sector of the cell. Control then passes back to step 267 and the process continues as described above. If the test result in step 279 is NO, indicating that all the sectors in the measuring cell have determined their downlink power, or the test result in step 263 is YES, which indicates that the cell being pointed to by i' is the cell for which the terminal receivers are off, control passes to conditional branch point 283.

Conditional branch point 283 tests to determine if i'<I, i.e., if there remains any cell in the cluster, other than the cell for which the terminal receivers are off, that has not yet had the downlink power for its sectors determined. If the test result in step 283 is YES, indicating that there is at least one cell in the cluster that has not yet had the downlink power for its sectors determined, control passes to step 285, in which i' is incremented, so that it points to the next cell of the cluster. Control then passes back to step 263 and the process continues as described above. If the test result in step 283 is NO, indicating that each cell in the cluster has had the downlink power for its sectors determined, control passes to step 289.

Note that as with steps 227 through 239, for pedagogical purposes, steps 261 through 285 are shown as being sequentially performed. However, those of ordinary skill in the art will readily recognize the advantage in time saved that can be realized by compressing the effects of these steps to perform each of the measurements required by the iterations of step 271 in parallel.

In step 287 all the terminal transmitters and all the base station receivers which had been transmitting are deactivated. Next, conditional branch point 289 tests to determine if j<J, i.e., if there remains any sectors in the cell that has not had a base station transmitter activated. If the test result in step 289 is YES, indicating that there indeed remains at least one sector in the cell that has not had a base station transmitter activated, control passes to step 291, in which j is incremented, so that it points to the next sector of the current cell i. Control then passes back to step 257 and the process continues as described above. If the test result in step 289 is NO, indicating that all of the sectors in the cell have had a base station transmitter activated, control passes to step 293.

Conditional branch point 293 tests to determine if i<I., i.e., if there remains any cell in the clusters that has not had a base station transmitter activated in each of its sectors. If the test result in step 293 is YES, indicating that indeed there remains at least one cell in the cluster that has not had a base station transmitter activated in each of its sectors, control passes to step 295, in which i is incremented, so that it points to the next cell of the cluster. Control then passes back to step 255 and the process continues as described above. If the test result in step 293 is NO, indicating that there remains no cells in the cluster that has not had a base station transmitter activated in each of its sectors, control passes to step 297, in which the process is exited.

Figure 3:
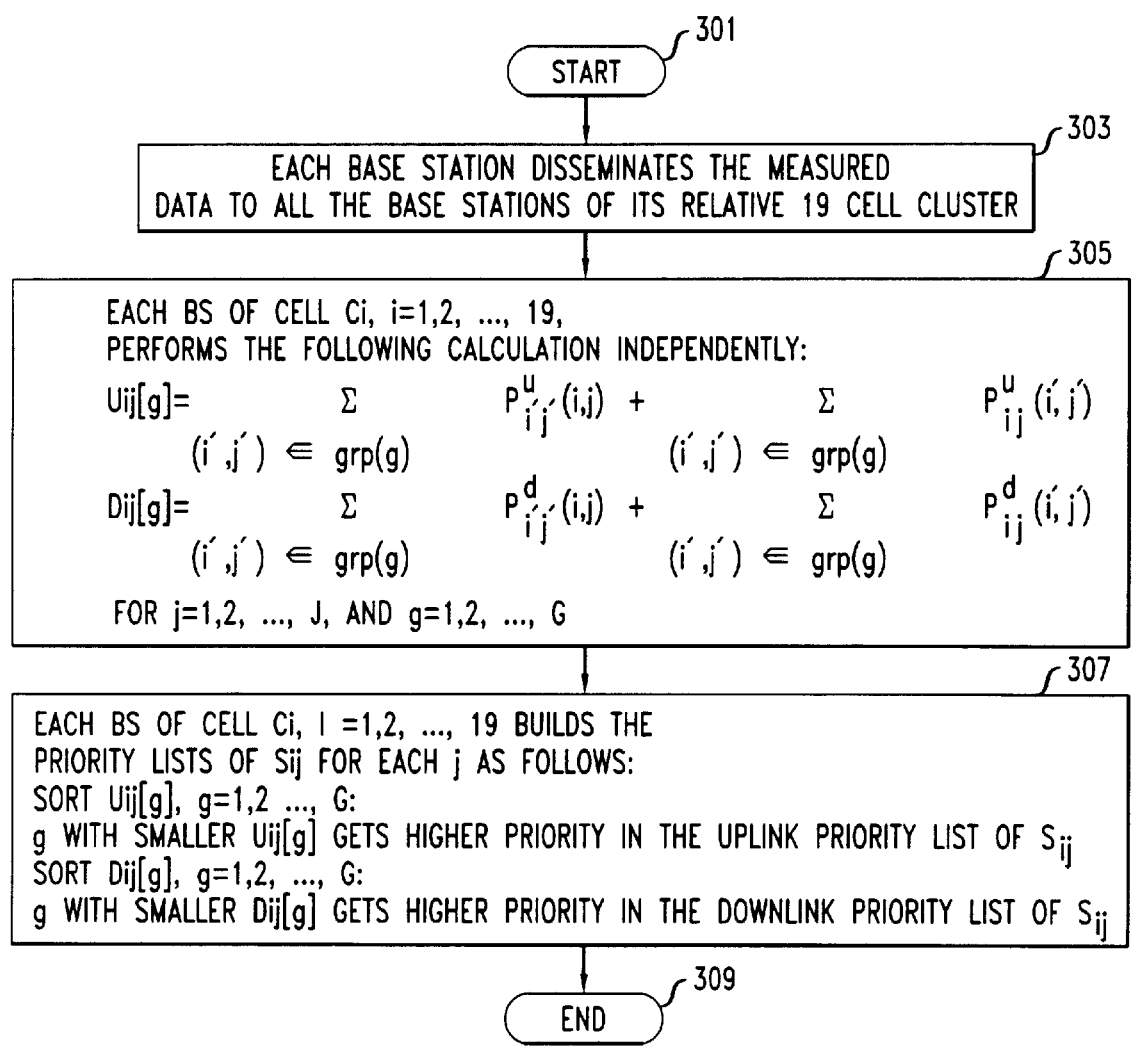
FIG. 3 shows an exemplary process, in accordance with the principles of the invention, for building priority lists for use in assigning channels from the data measured using the process shown in FIG. 2.

FIG. 3 shows an exemplary process, in accordance with the principles of the invention, for building priority lists for use in assigning channels, from the data measured using the process shown in FIG. 2. Prior to executing the process of FIG. 3 the channels must be divided into G channel groups as is conventionally done for prior art fixed wireless systems. As a simple example for pedagogical purposes, G=4 for an unsectorized GSM system, as shown in FIG. 1. Each channel group is assigned to the like positioned cell, or sector within a cell, of each of a first fixed clusters 105. Also, the measurements which are obtained from performing the process of FIG. 2 must be available prior to performing the process of FIG. 3. The process is typically performed whenever there is a change in the assignment of the G channel groups, which is relatively rare, or when there are new measurements that are produced from performing the measurement process of FIG. 2, which although not common happens more often. Note that for each relative interference cluster centered on a cell there is a function, grp(g) that contains all sectors of the relative interference cluster that have group g as their primary channel group.

In step 303 each base station disseminates the power measurements produced by performing the process of FIG. 2 to each of the other base stations in its relative cluster. Next, in step 305, each base station, e.g., base station i, computes for each sector Sij of its J sectors and for each channel group g, a quantity Uij(g) indicative of the average uplink interference that is expected to result from use of channel group g to by terminals located in sector Sij. More specifically, Uij(g) is the sum of two terms, i.e., $$Uij(g) = \sum_{i',j' \in grp(g)} P^u_{i',j'}(i,j) + \sum_{i',j' \in grp(g)} P^u_{i',j'}(i',j').$$

The first term $$\sum_{i',j' \in grp(g)} P^u_{i',j'}(i,j),$$

is the sum of the interference power received by the base station's sector receivers in the relative cluster of cell i that were allocated a channel group g and was caused by transmitters of terminals in sector Sij. The second term $$\sum_{i',j' \in grp(g)} P^d_{i',j'}(i',j'),$$

is the sum of the power received by the base station's receiver for sector Sij that was generated by the transmitters of all the terminals located in sectors of the relative cluster of cell i and allocated channel group g.

Also, in step 305, each base station, e.g., base station i, computes for each sector Sij of its J sectors and for each channel group g, a quantity Dij(g) indicative of the average downlink interference that is expected to result from use of channel group g by base station transmitters located in sector Sij. More specifically, Dij(g) is the sum of two terms, i.e., $$Dij(g) = \sum_{i',j' \in grp(g)} P^d_{i',j'}(i,j) + \sum_{i',j' \in grp(g)} P^d_{i,j}(i',j').$$

The first term $$\sum_{i',j' \in grp(g)} P^d_{i',j'}(i,j),$$

is the sum of the interference power received by all of the terminal receivers in the relative cluster of cell i located in sectors that were allocated channel group g and was caused by the base station transmitter of sector Sij. The second term $$\sum_{i',j' \in grp(g)} P^d_{i',j'}(i',j'),$$

is the sum of the power received by all of the terminal receivers located in sector Sij and that was generated by the base station transmitter of sector within the relative cluster of cell i that were allocated channel group g.

Each base station builds a priority list for the uplink, and a second priority list for the downlink, for each of its sectors in step 307 as follows. For the uplink, the base station assigns a priority to each channel group so that as each channel group has an increasingly smaller value of Uij(g) that channel group receives an increasingly higher priority assignment in the uplink priority list. Furthermore, after determining the priorities, regardless of its actual computed priority, the highest priority is given to the channel group assigned to the sector while none of the relative priorities of any of the other channel groups is changed. Note that if the channel group assigned to the sector did not naturally fall out as having the highest priority the implementor may want to investigate the underlying cause, as this tends to indicate a problem with the initial channel group assignments. The groups are then numbered from 1 to in priority order, so that the group having the highest priority is priority number 1 and the group having the lowest priority is priority number G.

Similarly, for the downlink, the base station assigns a priority to each channel group so that as each channel group has an increasingly smaller value of Dij(g) that channel group receives an increasingly higher priority assignment in the downlink priority list. Again, after determining the priorities, regardless of its actual computed priority, the highest priority is given to the channel group assigned to the sector while none of the relative priorities of any of the other channel groups is changed. Note that if the channel group assigned to the sector did not naturally fall out as having the highest priority the implementor may want to investigate the underlying cause, as this tends to indicate a problem with the initial channel group assignments. The groups are then numbered from 1 to G, in priority order, so that the group having the highest priority is priority number 1 and the group having the lowest priority is priority number G.

To reduce the required computations, those of ordinary skill in the art will readily recognize that the computations of the interferences for the channel group assigned to the sector may be eliminated, as the channel group assigned to the sector is always given highest priority. Upon completion of this step, each base station has 2J priority lists.

The process then exits in step 309.

Figure 4:
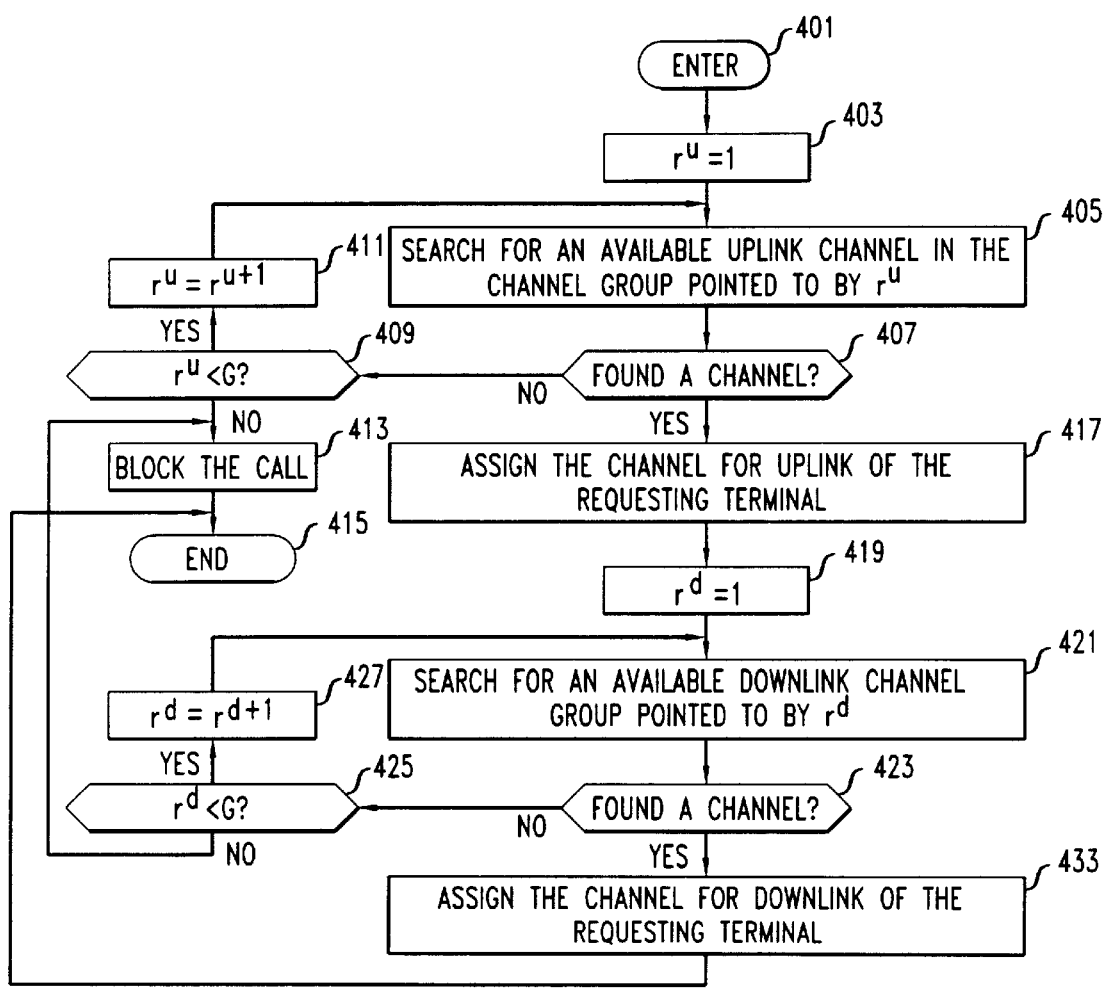
FIG. 4 shows an exemplary process, in accordance with the principles of the invention, to assign channels by making use of the uplink and downlink priority lists developed by the process of FIG. 3.

FIG. 4 shows an exemplary process, in accordance with the principles of the invention, to assign channels by making use of the uplink and downlink priority lists developed by the process of FIG. 3. The process is entered in step 401 when a call request is received at a base station for communication with a terminal in sector j of that base station. In step 403, a counter for the uplink priority lists, $r^u$, is initialized to 1, so that it indicates the uplink channel group having the highest priority. Next, a search is performed in the uplink channel group having a priority of $r^u$ for an available channel, in step 405. Note that to improve performance each base station should perform the search through the channels using its own particular order that is independently and randomly chosen. As coordination with regard to selection of channels is possible within a cell, since, at least in one embodiment of the invention, all the sectors of a cell are controlled by the same base station, the base station searches for, and considers as available, only an uplink channel that is not already being used inside the cell for which the call request was generated.

Conditional branch point 407 tests to determine if an available channel was found during the search. If the test result in step 407 is NO, indicating a channel was not found in the channel group indicated by the current value of $r^u$, control passes to conditional branch point 409, which tests to determine if $r^u<G$, i.e., to test if all of the channel groups on the uplink priority list have been searched. If the test result in step 409 is YES, indicating there remains channel groups on the uplink priority list that have not yet been searched, then, in accordance with an aspect of the invention, control passes to step 411 which increments $r^u$ so that it indicates the next lower priority channel group on the uplink priority list of the sector. Control then passes back to step 405 to search through the next lower priority channel group on the uplink priority list of the sector, in accordance with an aspect of the invention, and the process continues as described above.

If the test result in step 409 is NO, indicating that all the channel groups on the uplink priority list have been searched, control passes to step 413, in which the call request is blocked. The process then exits in step 415.

If the test result in step 407 is YES, indicating a channel has been found for use by the uplink, control passes to step 417, in which the channel that has been found is assigned for use by the uplink of the requested call.

Thereafter, in step 419, a counter for the downlink priority lists, $r^d$, is initialized to 1, so that it indicates to the downlink channel group having the highest priority. Next, a search is performed in the downlink channel group having a priority of $r^d$ for an available channel, in step 421. Note that to improve performance each base station should also perform this search through the channels using its own particular order that is independently and randomly chosen. In the same manner as for the uplink, as coordination with regard to selection of channels is possible within a cell, since, at least in one embodiment of the invention, all the sectors of a cell are controlled by the same base station, the base station searches for, and considers as available, only a downlink channel that is not already being used inside the cell for which the call request was generated. Conditional branch point 423 tests to determine if an available channel was found during the search. If the test result in step 423 is NO, indicating a channel was not found in channel group indicated by the current value of $r^d$ control passes to conditional branch point 425, which tests to determine if $r^d<G$. i.e., to test if all of the channel groups on the downlink priority list have been searched. If the test result in step 425 is YES, indicating there remains channel groups on the downlink priority list that have not yet been searched, then, in accordance with an aspect of the invention, control passes to step 427 which increments $r^d$ so that it indicates the next lower priority channel group on the downlink priority list of the sector. Control then passes back to step 421 to search through the next lower priority channel group on the downlink priority list of the sector, in accordance with an aspect of the invention, and the process continues as described above.

If the test result in step 425 is NO, indicating that all the channel groups on the downlink priority list have been searched, control passes to step 413, in which the call request is blocked. The process then exits in step 415.

If the test result in step 423 is YES, indicating a channel has been found for use by the downlink, control passes to step 433, in which the channel that has been found is assigned for use by the downlink of the requested call. The process then exits in step 415.

Figure 5:
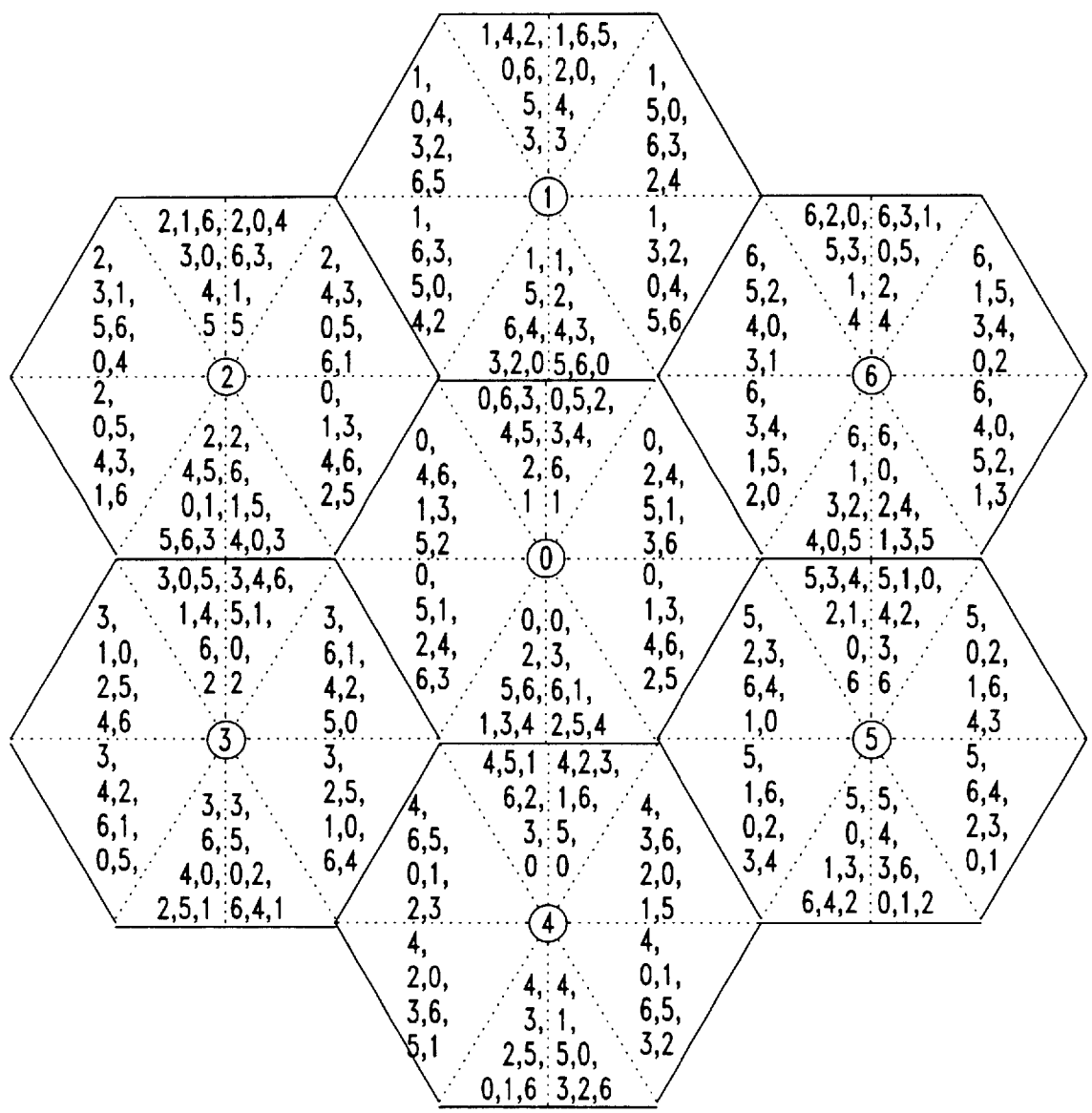
FIG. 5 shows an exemplary set of uplink priority lists for a locality based on a reuse cluster size of 7, with a fixed interference cluster size and a relative interference cluster size of 19, and in which each cell has eight sectors.

FIG. 5 shows an exemplary set of uplink priority lists for a locality based on a reuse cluster size of 7, with a fixed interference cluster size and a relative interference cluster size of 19, and in which each cell has eight sectors. The center of each cell is marked with an identifier of the primary uplink channel group for that cell. In this particular example, the channels of each cell's primary uplink channel group are not allocated to the various sectors within the cell. Thus, each sector has as its primary uplink channel group the primary uplink channel group of the cell in which it is located.

In each sector there is shown the prioritized list of uplink channel groups for that sector. Although ideally the lists would be shown in descending order in a single dimension, because of space constraints the prioritization is by line from top to bottom, with the highest priority being at the top, and within a single line from left to right, with the left having a higher priority. Thus, for example, for the center cell which has as its primary uplink channel group uplink channel group 0, its upper rightmost sector's uplink priority list is 0, 2, 4, 5, 1, 3, 6, with 0 having the highest priority and 6 having the lowest.

The example of FIG. 5 is based on a simulation model and employs the assumption that there is a uniform distribution of the terminals within the cells. Note that, notwithstanding the fact that each sector has as its primary uplink channel group the primary uplink channel group of the cell in which it is located, the various prioritized lists of uplink channel groups for each sector within a cell are different as they are a function of the location of the sector.

What is claimed is:

1. A method for assigning a channel in response to a request for service for a wireless terminal of a wireless communication system, the territory served by said wireless communication system being divided into a plurality of regions, said wireless terminal being located in one of said regions, the method comprising the steps of:

developing a prioritized list of channel groups for at least said region in which said wireless terminal is located; and selecting a channel from the one of said channel groups that has the highest priority of those channel groups that have an available channel within said region, the method being CHARACTERIZED in that said prioritized list is developed based on interference measurements which are only made from time to time on a long-term basis.

2. The invention as defined in claim 1 wherein said region is a cell of said wireless communication system.

3. The invention as defined in claim 1 wherein said region is a sector of a cell of said wireless communication system.

4. The invention as defined in claim 1 wherein, in said selecting step, said channel is selected randomly from the available channels of said group of channels having the highest priority and having an available channel.

5. The invention as defined in claim 1 wherein said developing step further comprises the steps of:
   determining interregion interference estimates for said fixed wireless communication system.

6. The invention as defined in claim 5 wherein said interregion interference is determined using a common receiver power level at a base station of said region.

7. The invention as defined in claim 1 wherein said method is performed for a plurality of base station is and wherein, each of said base stations performs said selecting step randomly and independently.

8. The invention as defined in claim 1 wherein for each of said regions there is a priority list for uplink channels and a priority list for downlink channels.

9. The invention as defined in claim 1 wherein said developing and selecting steps are performed for uplink channels, the method further comprising the steps of:
   developing a prioritized list of downlink channel groups for at least said region in which said wireless terminal is located; and
   selecting a downlink channel from the one of said downlink channel groups having the highest priority and having an available channel.

10. The invention as defined in claim 1 wherein each of said regions belongs to a channel reuse cluster, with each region being assigned a primary group of channels, with regions in like positions within a channel reuse cluster being assigned like channels as their primary group of channels, and wherein a highest priority is assigned in said developing step to channels within said primary group of channels for said region.

11. The invention as defined in claim 1 wherein said region is a sector that belongs to a cell, and wherein a channel is considered available only when it is not in use within said cell.

12. A method for processing request for wireless service with a base station serving at least one region, said request being for a wireless uplink channel and a wireless downlink channel, the method comprising the steps of:
   developing a first prioritized list of channel groups for at least said region in which said wireless terminal is located, said groups of said first prioritized list being groups of uplink channels; and
   developing a second prioritized list of channel groups for at least said region in which said wireless terminal is located, said groups of said second prioritized list being groups of downlink channels;
   selecting a channel from the one of said uplink channel groups that is the one of said uplink channel groups of said first prioritized list that has the highest priority from among those uplink channel groups on said second prioritized list that have remaining an available uplink channel in said region; and
   selecting a channel from the one of said downlink channel groups that is the one of said downlink channel groups of said second prioritized list that has the highest priority from among those downlink channel groups on said second prioritized list that have remaining an available downlink channel in said region;

the method being CHARACTERIZED in that
   each of said first and second prioritized lists is developed based on interference measurements which are only made from time to time on a long-term basis.

13. The invention as defined in claim 12 wherein said region is a sector, and wherein in said steps of selecting a channel from an uplink channel group said channel is selected also only when it is not in use in a cell which includes said sector and wherein in said steps of selecting a channel from a downlink channel group said channel is selected also only when it is not in use in a cell which includes said sector.

14. A method for use in assigning channels to a request for service in a region of a fixed wireless system, the method comprising the steps of:
   assigning to each region being served by said fixed wireless system a group of channels as a respective primary channel group in accordance with a fixed channel reuse plan, with each region being a member of a reuse cluster and where like positioned regions within each reuse cluster are assigned the same primary channel group; and
   borrowing a channel from a primary channel group of a different region when said region does not have an available channel in its primary channel group to serve said request, said channel being borrowed being a member of a channel group that remains with a highest priority on a prioritized list of channel groups for said region that have not had all of their channels assigned in an area, said prioritized list of channel groups for said region that have not had all of their channels assigned in said area being developed by eliminating those channel groups that have had all their channels assigned in said area from a master prioritized list of channel groups available for use by said region.

15. The invention as defined in 14 wherein said master prioritized list of channel groups available for use by said region includes all groups of channels for uplink use in a cluster including said region.

16. The invention as defined in 14 wherein said area and said region are coextensive.

17. The invention as defined in 14 wherein said area and said region are coextensive and are a cell with said reuse cluster.

18. The invention as defined in 14 wherein said area is a cell and said region is a sector within said cell.

19. The invention as defined in 14 wherein said master prioritized list of channel groups available for use by said region includes all groups of channels for downlink use in a cluster including said region.

20. The invention as defined in claim 19 wherein said master priority list is developed as a function of interregion interference.

21. The invention as defined in claim 19 wherein said master priority list is prioritized so that a channel group less likely to cause interference is given a higher priority than a channel group more likely to cause interference.

22. The invention as defined in claim 19 wherein said master priority list is redeveloped from time to time.

23. A method for use in assigning an uplink channel and a downlink channel to a request for service in a cell of a fixed wireless system in which each group of a plurality of groups of channels is assigned as a respective primary uplink channel group for each cell in accordance with a fixed channel reuse plan and each group of a plurality of groups of channels is assigned as a respective primary downlink channel group for each cell in accordance with said fixed channel reuse plan, with like positioned cells within each reuse cluster being assigned the same primary uplink and downlink channel groups, said cell having a prioritized uplink list of uplink channel groups exclusive of said primary group assigned to said cell and a prioritized downlink list of downlink channel groups exclusive of said primary downlink group assigned to said cell the method comprising the steps of:

assigning an uplink channel for use in serving said request from said primary uplink group of said cell when an uplink channel is available in said primary uplink group of said cell;

assigning a borrowed uplink channel from a primary uplink channel group of a different cell when said cell does not have an available channel in its primary uplink channel group to serve said request, said borrowed uplink channel being a member of an uplink channel group that (i) is a member of a set of uplink channel groups that has as yet not had all of its channels assigned in said cell and (ii) has the highest priority, within said set, according to the prioritization of said prioritized list of uplink channel groups;

assigning a downlink channel for use in serving said request from said primary downlink group of said cell when a downlink channel is available in said primary downlink group of said cell; and assigning a borrowed downlink channel from a primary downlink channel group of a different cell when said cell does not have an available channel in its primary downlink channel group to serve said request, said borrowed downlink channel being a member of a downlink channel group that (i) is a member of a set of downlink channel groups that has as yet not had all of its channels assigned in said cell and (ii) has the highest priority, within said set, according to the prioritization of said prioritized list of downlink channel groups.

24. The invention as defined in claim 23 wherein the prioritization of said prioritized list of uplink channels is based on uplink interference calculations.

25. The invention as defined in claim 23 further wherein the prioritization of said prioritized list of downlink channels is based on downlink interference calculations.

26. A method for use in assigning an uplink channel and a downlink channel to a request for service in a sector of a cell of a fixed wireless system in which each group of a plurality of groups of channels is assigned as a respective primary uplink channel group for each sector in accordance with a fixed channel reuse plan and each group of a plurality of groups of channels is assigned as a respective primary downlink channel group for each sector in accordance with said fixed channel reuse plan, with like positioned sectors within each reuse cluster being assigned the same primary uplink and downlink channel groups, said sector having a prioritized uplink list of uplink channel groups exclusive of said primary group assigned to said sector and a prioritized downlink list of downlink channel groups exclusive of said primary downlink group assigned to said sector, the method comprising the steps of:

assigning an uplink channel for use in serving said request from said primary uplink group of said sector when an uplink channel is available in said primary uplink group of said sector;

assigning a borrowed uplink channel from a primary uplink channel group of a different sector when said sector does not have an available channel in its primary uplink channel group to serve said request, said borrowed uplink channel being a member of an uplink channel group that (i) is a member of a set of uplink channel groups that has as yet not had all of its channels assigned in said cell and (ii) has the highest priority, within said set, according to the prioritization of said prioritized list of uplink channel groups;

assigning a downlink channel for use in serving said request from said primary downlink group of said sector when a downlink channel is available in said primary downlink group of said sector; and assigning a borrowed downlink channel from a primary downlink channel group of a different sector when said sector does not have an available channel in its primary downlink channel group to serve said request, said borrowed downlink channel being a member of a downlink channel group that (i) is a member of a set of downlink channel groups that has as yet not had all of its channels assigned in said cell and (ii) has the highest priority, within said set, according to the prioritization of said prioritized list of downlink channel groups.

27. The invention as defined in claim 26 further including the step of developing said prioritized list of said groups of uplink channels and said prioritized list of said groups of downlink channels.

28. The invention as defined in claim 27 wherein said developing step further includes the step of measuring uplink and downlink interference powers.

29. A method for use in assigning an uplink channel to a request for service in a sector of a cell of a fixed wireless system in which each group of a plurality of groups of channels is assigned as a respective primary uplink channel group for each sector in accordance with a fixed channel reuse plan, and wherein each of said sectors is part of its own relative interference cluster, cells of each relative interference cluster being enumerated by index i, with i ranging from 1 to the number of cells in the interference cluster I, with each cell being divided into J sectors, the sectors being enumerated by j, with j ranging from 1 to J, where J is equal to or greater than 1, the method comprising the steps of:

receiving uplink interference measurements from cells that are located within a relative interference cluster of said region;

calculating a quantity indicative of the average uplink interference that is expected to result from use of channel group g by terminals located in sector Sij as $$U_{ij}(g) = \sum_{i',j' \in grp(g)} \overset{u}{P}_{i',j'}(i,j) + \sum_{i',j' \in grp(g)} \overset{u}{P}_{i,j}(i',j')$$

where
grp(g) is all sectors of the relative interference cluster that were allocated group g as their primary channel group by said reuse plan;

$$\sum_{i',j' \in grp(g)} \overset{u}{P}_{i',j'}(i,j),$$

is the sum of the interference power received by the base station's sector receivers in the relative cluster of cell i that were allocated channel group g as their primary channel group by said reuse plan and was caused by transmitters of terminals in sector Sij;

$$\sum_{i',j' \in grp(g)} \overset{u}{P}_{i',j'}(i',j'),$$

is the sum of the power received by the base station's receiver for sector Sij that was generated by the transmitters of all terminals located in sectors of the relative cluster of cell i and allocated channel group g as their primary channel group; and assigning a priority to each channel group by preemptively assigning the highest priority to the channel group assigned to said sector and thereafter assigning priorities so that channel groups with increasingly smaller value of Uij(g) receive increasingly higher priorities.

30. The invention as defined in claim 29 further comprising the step of selecting a channel to serve said request from the one of said channel groups on said priority list that has the highest priority of those channel groups that has an uplink channel that is not in use within said cell.

31. The invention as defined in claim 30 wherein said uplink channel is selected randomly from those channels in said channel group from which said channel is selected.

32. The invention as defined in claim 29 further comprising the step of taking the necessary interference measurements to calculate $$Uij(g) = \sum_{i',j' \in grp(g)} \overset{u}{P}_{i',j'}(i,j) + \sum_{i',j' \in grp(g)} \overset{u}{P}_{i,j}(i',j').$$

33. A method for use in assigning a downlink channel to a request for service in a sector of a cell of a fixed wireless system in which each group of a plurality of groups of channels is assigned as a respective primary downlink channel group for each sector in accordance with a fixed channel reuse plan, and wherein each of said sectors is part of its own relative interference cluster, cells of said relative interference cluster being enumerated by index i, with i ranging from 1 to the number of cells in the interference cluster I, with each cell being divided into J sectors, the sectors being enumerated by j, with j ranging from 1 to J, where J is equal to or greater than 1, the method comprising the steps of:

receiving downlink interference measurements from cells that are located within a relative interference cluster of said region;

calculating a quantity indicative of the average downlink interference that is expected to result from use of channel group g by base station transmitters located in sector Sij, as $$Dij(g) = \sum_{i',j' \in grp(g)} \overset{d}{P}_{i',j'}(i,j) + \sum_{i',j' \in grp(g)} \overset{d}{P}_{i,j}(i',j')$$

where grp(g) is all sectors of the relative interference cluster that were allocated group g as their primary channel group by said reuse plan;

$$\sum_{i',j' \in grp(g)} \overset{d}{P}_{i',j'}(i,j),$$

is the sum of the interference power received by all terminal receivers in the relative interference cluster of cell i located in sectors that were allocated channel group g as their primary channel group by said reuse plan and was caused by the base station transmitter of sector Sij;

$$\sum_{i',j' \in grp(g)} \overset{d}{P}_{i,j}(i',j'),$$

is the sum of the power received by all of the terminal receivers located in sector Sij and that was generated by the base station transmitter of sector within the relative interference cluster of cell i that were allocated channel group g as their primary channel group; and assigning a priority to each channel group by preemptively assigning the highest priority to the channel group assigned to said cell and thereafter assigning priorities so that channel groups with increasingly smaller value of Dij(g) receive increasingly higher priorities.

34. The invention as defined in claim 33 further comprising the step of taking the necessary interference measurements to calculate $$Dij(g) = \sum_{i',j' \in grp(g)} \overset{d}{P}_{i,j}(i,j) + \sum_{i',j' \in grp(g)} \overset{d}{P}_{i,j}(i',j')$$

35. The invention as defined in claim 33 further comprising the step of selecting a channel to serve said request from the one of said channel groups on said priority list that has the highest priority of those channel groups that has a downlink channel that is not in use within said cell.

36. The invention as defined in claim 35 wherein said downlink channel is selected randomly from those channels in said channel group from which said channel is selected.

37. A method for assigning a channel in response to a request for service for a wireless terminal of a wireless communication system, the territory served by said wireless communication system being divided into at least a plurality of cells, said wireless terminal being located in one of said cells, each of said cells being assigned a primary channel group, the method comprising the step of:

assigning a channel from a channel group that is not the primary channel group for said cell in which said wireless terminal is located, said assigning being performed as a function of a prioritized list of channel groups without coordinating assignment of said channel with any other cell on a per-request basis;

the method being CHARACTERIZED in that said prioritized list is developed based on interference measurements which are only made from time to time on a long-term basis.

38. The invention as defined in claim 37 wherein said assigned channel is selected randomly from those channels of said channel group from which said channel is assigned in said assigning step.

39. The invention as defined in claim 37 wherein said channel assigned is of a type of one of the types of a set consisting of uplink and downlink.

40. The invention as defined in claim 37 wherein said prioritized list is developed based on interference measurements.

41. The invention as defined in claim 37 wherein said channel assigned is an uplink channel and said prioritized list is developed based on average uplink interference determinations which are derived from interference measurements.

42. The invention as defined in claim 37 wherein said channel assigned is a downlink channel and said prioritized list is developed based on average downlink interference determinations which are derived from interference measurements.

43. The invention as defined in claim 37 further including the step of updating said prioritized list from time to time.

44. The invention as defined in claim 37 wherein said prioritized list is only for a sector of said cell in which said wireless terminal is located.

45. The invention as defined in claim 37 wherein said prioritized list is for said cell in which said wireless terminal is located.

* * * * *